Patented Sept. 20, 1938

2,130,740

UNITED STATES PATENT OFFICE 2,130,740

ESTERS OF HYDROGENATED ABIETYL ALCOHOL AND METHOD OF PRODUCING

Irvin W. Humphrey, Wilmington, Del., assignor to Hercules Powder Company, Wilmington, Del., a corporation of Delaware No Drawing. Application August 30, 1933, Serial No. 687,481

46 Claims. (Cl. 260—100)

This invention relates to esters of hydrogenated abietyl alcohol and method of producing.

The esters contemplated by this invention will be produced from fully or partially hydrogenated abietyl alcohol, as, for example, dihydro and tetrahydro abietyl alcohol or their mixtures, by reaction with an organic acid or an equivalent therefor according to the method contemplated by this invention.

More specifically in producing esters in accordance with this invention abietyl alcohol may be first hydrogenated to the desired degree and then esterified with an organic acid or equivalent by heating with or without the use of an esterification catalyst. Or the abietyl alcohol may first be esterified with the organic acid, and the abietyl ester so formed hydrogenated to the desired degree. The hydrogenated abietyl alcohol may also be prepared directly by the hydrogenation and reduction of the abietyl group to the alcohol group of abietic acid or its esters.

In proceeding to the practical adaptation of this invention the abietyl alcohol may be produced by any suitable method, as for example by dissolving an ester of abietic acid, for example, ethyl or methyl abietate, in a monohydric aliphatic alcohol, for example, ethyl or butyl alcohol, heating the solution with metallic sodium, diluting the solution with water, distilling of the low boiling alcohol, and finally extracting the abietyl alcohol formed by means of a water immiscible solvent, as benzene. Hydrogenation of the abietyl alcohol so produced may be accomplished by any of the well known methods for the hydrogenation of unsaturated compounds.

Hydrogenated abietyl alcohol may also be obtained by reducing the carboxyl group of hydrogenated abietic acid to a primary alcohol group by treatment of hydrogenated abietic acid, or rosin, or an ester of hydrogenated abietic acid with hydrogen under pressure of say about 70–1000 atmospheres at an elevated temperature of say about 225–350° C., in the presence of a catalyst, such as, for example, copper chromite, nickel chromite, etc., all as is more fully disclosed in my application for United States Letters Patent, Serial Number 604,859, filed April 12, 1932, of which this application is a continuation in part. The hydrogenated abietyl alcohol so produced will consist of dihydro- or tetrahydroabietyl alcohol or a mixture thereof depending upon the exact conditions of temperature and pressure employed.

Thus, for example, a rosin ester, as ethyl abietate, in solution in ethyl alcohol is heated with metallic sodium and the abietyl alcohol formed is recovered. The abietyl alcohol is then treated with hydrogen at elevated temperature and pressure in the presence of a base metal hydrogenation catalyst as nickel, cobalt, copper chromite, etc., or at lower temperatures in the presence of a noble metal catalyst as platinum, palladium, etc. For example, the abietyl alcohol may be hydrogenated by treatment with hydrogen at a temperature of 125–225° C., and under a hydrogen pressure of about 5–400 atmospheres, in the presence of a nickel hydrogenation catalyst. Such procedure will result in the production of a mixture of dihydro- and tetrahydroabietyl alcohol by addition of hydrogen to the unsaturated bonds of the abietyl alcohol. The proportion of tetrahydro abietyl alcohol will be increased with increase of the pressure used above about 100 atmospheres.

Alternatively, for example, the hydrogenated abietyl alcohol may be produced by reducing the ester group of, for example, hydrogenated ethyl butyl or methyl abietate to the alcohol group with hydrogen, at a temperature of about 225–325° C., under pressure of 80–1000 atmospheres and in the presence of a conversion catalyst such as copper-chromite, nickel chromite, etc. If desired hydrogenated rosin, dihydroabietic acid, tetrahydroabietic acid, or their mixtures, may be converted into dihydro- or tetrahydro-abietyl alcohol or mixtures thereof similarly. The rosin ester, rosin, or abietic acid may be first hydrogenated by contacting with a base metal hydrogenation catalyst as nickel, copper-chromite, cobalt, etc., at a temperature of about 150–225° C. and under about 10–500 atmospheres hydrogen pressure, yielding either dihydro- and tetrahydro-abietate esters or dihydro- and tetrahydro-abietic acid.

The esters contemplated by this invention may be formed by reacting partially or fully hydrogenated abietyl alcohol with an organic acid, or equivalently with an organic anhydride, or certain organic acid compounds, as organic acid chlorides, acid esters, etc. The organic acid or equivalent may be aromatic, hydroaromatic, heterocyclic, or aliphatic, and may be monobasic or polybasic. As illustrative, the organic acid or equivalent may, for example, be acetic, butyric, propionic, valeric, furoic, benzoic, cinnamic, salicylic, lactic, oleic, palmitic, stearic, lauric, linoleic, linolenic, abietic, dihydro abietic, tetrahydro abietic, pimaric, ricinoleic, dihydroxy stearic, glycollic, formic, naphthenic, anisic, capric, tetrahydro-furoic acid, caprylic, cerotic, pyruvic, naphthoic, sorbic, hydrosorbic, carnaubic, mellissic, margaric, toluic, erucic, levulinic, myristic, monylic, sativic, undecylenic, alpha or beta-elaeostearic, etc., or mixtures thereof; adipic, citric, citraconic, maleic, malic, tartaric, sebacic, succinic, terephthalic, phthalic, itaconic, malonic, oxalic, glutaric, suberic, camphoronic, methyl succinic, terephthalic, azelaic, aconitic, tricarballylic, diphenic, fumaric, naphthalic, acids present in copal and kauri, and pyromellitic, etc., or mixtures thereof. Substituted organic acids as monochlor acetic, dichlor acetic, nitrobenzoic, etc., may be used. Likewise the acidic groups in acid esters as mono-methyl succinate, alpha-terpinene monobutyl maleate, the monoethyl maleate of methyl abietate, the dimethyl maleate of abietic acid, the monomethyl ester of alpha-pinene-maleic anhydride, monoethyl phthalate, etc., may be esterified with hydrogenated abietyl alcohol. As indicated, organic anhydrides, as acetic, phthalic, maleic, succinic, etc. anhydrides, or addition products of maleic anhydride to unsaturated compounds, as terpinene-maleic anhydride, dipentene-maleic anhydride, abietic-acid-maleic anhydride, abietyl-alcohol maleic anhydride, butadiene-maleic anhydride, pinene-maleic anhydride etc. may be used.

Since hydrogenated abietyl alcohol is high boiling, the esters may generally be produced without the use of a catalyst, especially when the organic acid is also comparably non-volatile, as is the case, for example, with abietic, hydrogenated abietic, succinic, stearic, palmitic, etc., acids. However, it is frequently desirable to employ a catalyst and when such is used, for example, 1–3% by weight of dry hydrogen chloride or concentrated hydrochloric acid, less than 1% of concentrated sulphuric acid, anhydrous zinc chloride, small amounts of phosphoric acid, or a small percentage of paratoluene sulphonic acid, benzene sulphonic acid, acid sodium sulphate, boric anhydride, etc., or mixtures thereof will be found satisfactory.

If desired in carrying out the method contemplated a relatively low boiling water immiscible solvent for the ester product, as benzene, toluene, carbon tetrachloride, etc., may be used to assist in the removal of the water of reaction.

In the practical adaptation of the method embodying this invention for production of the esters contemplated, generally speaking the hydrogenated abietyl alcohol, as dihydro or tetrahydro abietyl alcohol, or a mixture thereof, will be reacted by heating with an organic acid, or equivalently an organic anhydride, or acid compound of an organic acid, as an acid ester, with or without use of a catalyst and/or a low boiling water immiscible solvent to facilitate the removal of water of reaction. On completion of the reaction, if an excess of organic acid was used, or if the ester product be too acid, it may be dissolved in a suitable water immiscible solvent, as benzene, toluene, etc., and the solution washed with aqueous alkali, to remove excess acid with final evaporation of the solvent.

If a volatile organic acid, such as, for example, acetic acid, etc., be used the esterification may be carried out by passing an excess of the volatile acid into the heated hydrogenated abietyl alcohol. The excess acid may be removed along with the water of reaction by distillation.

In proceeding, the reaction may be carried out at any operable temperature and pressure. Any temperature, including room temperature, which will not decompose the reagents or the product, under the pressure conditions prevailing and at which the reaction will proceed, in other words, various reaction temperatures may be used. Generally speaking, the reaction will proceed desirably at temperatures say within about the range 150°–300° C., and generally fairly rapidly at 175–225° C., under atmospheric pressure, while, desirably, permitting the water produced in the reaction to escape. The reaction will generally be completed, when using the temperatures indicated, within about 2–15 hours depending upon the temperature, catalyst, reactivity of the acid, and proportion of reagents.

The reagents may be heated in any desired proportion, but usually it will be found efficient to react the hydrogenated abietyl alcohol and an organic acid or equivalent in about the desired chemically equivalent reacting proportions forming neutral or acid esters from polybasic acids.

As specifically illustrative of the practical adaptation of the method in accordance with this invention for the production of the product contemplated, for example, 9 parts by weight of hydrogenated abietyl alcohol, say comprising a mixture of dihydro and tetrahydro abietyl alcohol, is heated at about 200° C., for about 8 hours with 1.8 parts of succinic acid, using an air condenser to permit the removal of water of reaction. The hydrogenated abietyl alcohol will be converted into an ester of low acidity.

As a further illustration, 21 parts of hydrogenated abietyl alcohol is allowed to react with 80 parts of acetic anhydride, containing 4 parts of sulphuric acid as a catalyst, at room temperature, for three days. The resultant ester will show only a few percent of unreacted alcohol.

As a further illustration, 10 parts of hydrogenated abietyl alcohol are heated with 10 parts of hydrogenated rosin for 5 hours at 250°–260° C., and then for 5 more hours at 260°–280° C. The resultant ester is a hydrogenated abietyl hydroabietate.

The esters in accordance with this invention are usually amorphous compounds. Sometimes they are very viscous liquids but are more generally solids with melting points varying from about 50 to 100° C. (drop method). When conditions are such as to effect a high degree of esterification the acid number varies from 5 to 25. They are in general more readily saponified than esters of abietic acid. Esters of hydrogenated abietyl alcohol are more resistant to discoloration on aging than esters of non-hydrogenated abietyl alcohol. They have thiocyanate values of from 0 to about 40 depending upon the degree of hydrogenation of the unsaturated bonds of the abietyl alcohol, and exhibit much lower iodin values than those of the corresponding non-hydrogenated abietyl esters. Their properties also depend upon the purity of the hydrogenated abietyl alcohol used.

The products in accordance with this invention will be found variously adaptable for use in the commercial arts as, for example, ingredients in coating compositions, as lacquer, varnishes, etc., or in plastic compositions. The products in accordance with this invention may be advantageously used in such compositions to replace in whole or in part other resins heretofore used for such purposes.

This application is filed as a continuation in part of an application for United States patent for method of producing abietyl alcohol and product, filed by me April 12, 1932, Serial Number 604,859.

What I claim and desire to protect by Letters Patent is:

1. An organic carboxylic acid ester of hydrogenated abietyl alcohol.
2. A monobasic carboxylic acid ester of hydrogenated abietyl alcohol.
3. A dibasic carboxylic acid ester of hydrogenated abietyl alcohol.
4. An aromatic carboxylic acid ester of hydrogenated abietyl alcohol.
5. An aliphatic carboxylic acid ester of hydrogenated abietyl alcohol.
6. A resin acid ester of hydrogenated abietyl alcohol.
7. A fatty acid ester of hydrogenated abietyl alcohol.
8. The method of forming an ester which includes reacting hydrogenated abietyl alcohol with an organic carboxylic acid.
9. The method of forming an ester which includes reacting hydrogenated abietyl alcohol with an acid organic carboxylic acid compound.
10. The method of forming an ester which includes reacting hydrogenated abietyl alcohol with an organic carboxylic acid in the presence of heat at a reaction temperature.
11. The method of forming an ester which includes reacting hydrogenated abietyl alcohol with an organic carboxylic acid at a temperature of about 150 to about 300° C.
12. The method of forming an ester which includes reacting hydrogenated abietyl alcohol with an organic carboxylic acid in the presence of an esterification catalyst.
13. The method of forming an ester which includes reacting hydrogenated abietyl alcohol with an organic carboxylic acid in the presence of heat at a reaction temperature and in the presence of an esterification catalyst.
14. The method of forming an ester which includes reacting hydrogenated abietyl alcohol with an organic carboxylic acid at a temperature of about 150 to about 300° C. and in the presence of an esterification catalyst.
15. A polybasic carboxylic acid ester of hydrogenated abietyl alcohol.
16. A hydroxy carboxylic acid ester of hydrogenated abietyl alcohol.
17. A cyclic carboxylic acid ester of hydrogenated abietyl alcohol.
18. An unsaturated carboxylic acid ester of hydrogenated abietyl alcohol.
19. A saturated carboxylic acid ester of hydrogenated abietyl alcohol.
20. A substituted carboxylic acid ester of hydrogenated abietyl alcohol.
21. A phthalic acid ester of hydrogenated abietyl alcohol.
22. A hydrogenated abietic acid ester of hydrogenated abietyl alcohol.
23. The method of forming an ester which includes reacting hydrogenated abietyl alcohol with an organic carboxylic acid at a temperature of about 175° C. to about 225° C.
24. The method of forming an ester which includes reacting hydrogenated abietyl alcohol with a resin acid in the presence of heat at a reaction temperature.
25. The method of forming an ester which includes reacting hydrogenated abietyl alcohol with a fatty acid in the presence of heat at a reaction temperature.
26. The method of forming an ester which includes reacting hydrogenated abietyl alcohol with phthalic acid in the presence of heat at a reaction temperature.
27. The method of forming an ester which includes reacting hydrogenated abietyl alcohol with hydrogenated abietic acid in the presence of heat at a reaction temperature.
28. A carboxylic acid ester of hydro-abietyl alcohol.
29. A compound of the general formula Ab—CH$_2$—O—CO—R, where Ab stands for the hydrocarbon nucleus of hydroabietic acid, while R stands for an organic radical of the alkyl, aralkyl, cycloalkyl or aryl series.
30. The ester of hydroabietyl alcohol and an acetic acid.
31. Hydroabietyl acetate.
32. Hydroabietyl-hydroabietate.
33. An ester of a polycarboxylic acid wherein the hydrogen of at least one carboxyl group is replaced by the radical of a hydroabietyl alcohol.
34. A hydroabietyl phthalate.
35. The method which includes reacting in the presence of heat a hydroxyl group of a hydrogenated abietyl alcohol with a carboxyl group derived from a carboxylic acid.
36. The method of producing an ester which includes reacting in the presence of heat a hydroxyl group of a hydrogenated abietyl alcohol with a carboxyl group of a polycarboxylic acid.
37. The method of producing an ester which includes reacting in the presence of heat and in the presence of a volatile water-immiscible solvent for the ester product a hydroxyl group of hydrogenated abietyl alcohol with a carboxyl group of a polycarboxylic acid.
38. Hydroabietyl phthalate.
39. The method of forming an ester which includes reacting hydrogenated abietyl alcohol with a carboxylic acid anhydride.
40. The process of preparing a carboxylic acid ester of hydroabietyl alcohol, which comprises reacting hydroabietyl alcohol with a carboxylic acid compound under anhydrous conditions.
41. The method of forming an ester which includes reacting hydrogenated abietyl alcohol with a carboxylic acid in the presence of a dehydrating agent.
42. The method of forming an ester which includes reacting a hydroxyl group of hydrogenated abietyl alcohol with a carboxyl group of a carboxylic acid.
43. The method of forming an ester which includes reacting hydrogenated abietyl alcohol with an organic polycarboxylic acid.
44. An unsaturated polycarboxylic acid ester of hydrogenated abietyl alcohol.
45. The method of forming an ester which includes reacting hydrogenated abietyl alcohol with an organic polycarboxylic acid.
46. A hydroxy polycarboxylic acid ester of hydrogenated abietyl alcohol.

IRVIN W. HUMPHREY.